Feb. 24, 1970 R. L. ORNDORFF, JR 3,497,278
BEARING ASSEMBLY
Filed Feb. 26, 1968

INVENTOR
Roy L. ORNDORFF, JR.
BY
W. A. Shira Jr.
ATTY.

United States Patent Office 3,497,278
Patented Feb. 24, 1970

3,497,278
BEARING ASSEMBLY
Roy L. Orndorff, Jr., Kent, Ohio, assignor to The B. F. Goodrich Company, New York, N.Y., a corporation of New York
Filed Feb. 26, 1968, Ser. No. 708,147
Int. Cl. F16c 27/00, 33/00
U.S. Cl. 308—238                                  16 Claims

ABSTRACT OF THE DISCLOSURE

A shaft bearing having the bearing surface formed of strips of elastomeric material lining the inner periphery of a cylindrical housing between radially inwardly projecting lugs with each strip being secured therein by a locking bar inserted in a longitudinal groove in the strip.

BACKGROUND OF THE INVENTION

This invention relates to a resilient elastomeric journal bearing assembly of the type particularly adapted for marine propeller shafts. Resilient elastomeric bearings have been found especially suitable for this purpose because they have exceptional resistance to corrosion and to abrasion resulting from bits of foreign material which are carried in suspension in the sea water or other liquid in which the shaft operates. Additionally, such bearings accommodate themselves to relatively small variations in the alignment of the shaft and thus are self-aligning to a limited extent. Furthermore, in certain installations, and in particular with marine shafting, lubrication of the bearing is provided continuously by the operating medium, usually sea water, in which the shaft is in service and therefore no other lubricant is required. Therefore, the self-lubricating feature of the elastomeric bearing makes it highly desirable for marine use and in particular, for the stern propeller shaft journals.

The most common types of elastomeric bearings for marine usage are (1) a continuous ring of elastomer with an outer tubular shield of rigid material, usually metal, securely bonded thereto or (2) strips of elastomer having rigid, preferably metal, backing strips bonded thereto with the elastomer and metal strips inserted longitudinally into recesses in the inner periphery of the cylindrical journal housing.

For small shafts requiring only axially short bearings, one-piece ring bearings are generally used; whereas, for large shafts requiring axially longer bearings, the strip-type bearings are used for ease of manufacture and installation.

As mentioned above, the elastomeric strips have heretofore been integrally bonded to the rigid metal backing strips, which are usually made of brass for resisting the corrosiveness of the sea water. The brass backing strips provide a sufficient rigidity such that the bearing strips can be axially pressed or driven in an interference or wedge fit into the recesses of the housing. However, the use of brass material and the step of bonding the elastomeric strip to the brass results in high manufacturing costs of the bearing. Furthermore, the pressing or driving the full length of the strip into the housing is often a difficult procedure and removal of the strip after pressing into the housing is even more difficult.

SUMMARY OF THE INVENTION

The present invention is a strip-type elastomeric bearing of the kind used for marine applications which provides a solution to the above-described problems in that the bearing may be manufactured more economically and installed more easily than bearings heretofore in use.

The bearing assembly of the present invention has a plurality of one-piece elatomeric strips each having two opposite, generally parallel, faces with a longitudinal groove in one face. Each strip is adapted to interfit equally spaced radial lugs on the inner periphery of a bearing housing and be secured in place by driving a locking bar means into the longitudinal groove in the strip for wedging the latter in the housing. This means of securing the bearing strip in the housing permits initial slip-fit assembly of the bearing strips into the housing and subsequent establishment of an interference fit relationship for securely retaining the bearing strips in the housing. In one embodiment, the relative movement between the strip and locking bar need be a fraction only of their total lengths.

DETAILED DESCRIPTION

Figure 1:
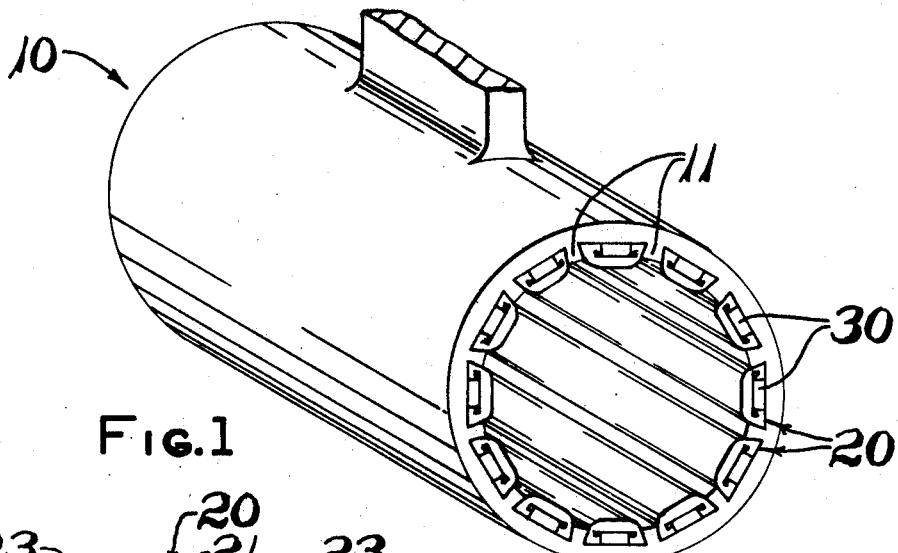
FIG. 1 is a perspective view of a marine propeller shaft housing with the bearing strips, made in accordance with this invention, installed to form the complete bearing assembly.
Figure 2:
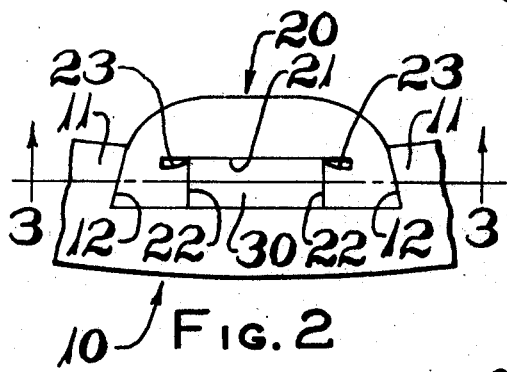
FIG. 2 is an enlarged fragmentary end view of a portion of FIG. 1 showing the details of the strip installation.
Figure 3:
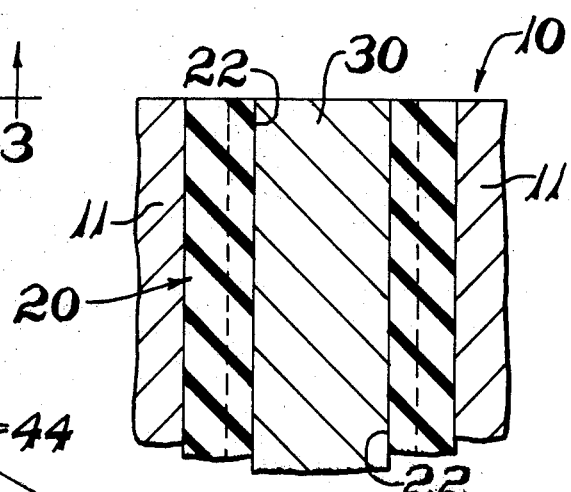
FIG. 3 is a portion of a sectional view taken along the section indicating lines 3—3 of FIG. 2.

Referring now to FIGS. 1, 2 and 3, the bearing assembly of the present invention is shown in the completed or installed configuration ready for insertion of a marine propeller shaft therein. The propeller shaft housing 10 is shown as a rigid cylinder, preferably of cast brass or bronze, having a plurality of longitudinally extending ribs 11 equal in width and equally spaced around the inner periphery of the housing projecting radially inwardly therefrom. The radial sides 12 of the ribs are generally obliquely disposed to the inner periphery of the cylinder such that the space between the adjacent ribs forms a groove having dovetailed sides.

The elastomeric bearing strip 20 is shown in FIGS. 2 and 3 in the presently preferred form for short bearings, of lengths less than 4 diameters, as having two generally parallel opposite surfaces with a flat-bottom longitudinal groove 21 formed centrally in one of the parallel surfaces. The groove has opposite parallel sides 22 extending at right angles to the base surface of the bearing strip with undercuts 23 formed in the sides 22 of the groove at the junctions of the sides with the bottom of the groove so that the groove is generally T-shaped in its undisturbed form. These undercuts 23, one on each side of the groove, permit deflection of the sides of the strip 20 when the bearing strip is installed and locked in the housing as hereinafter described. The width of the bearing strip 20 is preferably slightly less than the circumferential distance between adjacent ribs 11 in the bearing housing. This permits the bearing strips 20 to be freely assembled by slipping each of them longitudinally into the bearing housing between any two ribs.

When the bearing strips 20 are positioned between the ribs in the housing, a locking means, shown in FIG. 3 as a rectangular bar 30, is driven or pressed into the groove in the bearing strip. The locking bar 30, which is of rectangular cross-section, has its width slightly greater than the distance between the sides 22 of the groove 21 in the bearing strip. The thickness of the locking bar 30 is preferably equal to the depth of the groove 21. Therefore, when the locking bar is driven longitudinally into the groove 21 while the bearing strip is disposed in contact with the inner periphery of the housing 10, the bar 30 forces the sides of the bearing strip into contact with the sides 12 of the ribs 11 in the housing with sufficient force to cause a part of the said strip sides 22 to be distorted into the spaces 23 as shown in FIG. 2. The bar 30 may be made of metal, but is preferably made of rigid plastic as hereinafter described. In view of the dovetailed arrangement of the sides 12 of the ribs and the clamping action exerted upon the sides of the bearing strip 20, by the bar 30, radial movement of the bearing strip is prevented and thus the bearing is held securely in the housing.

Figure 4:
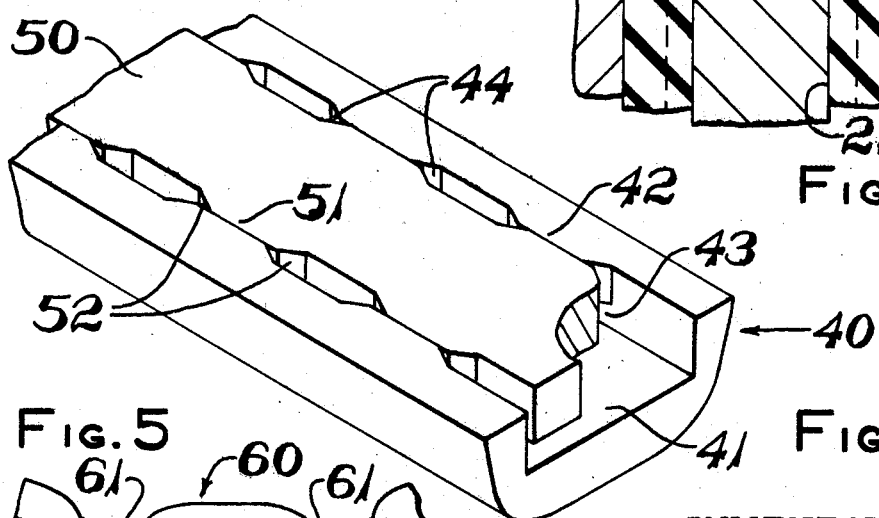
FIG. 4 is a perspective view of another embodiment of the bearing strip and locking bar means.

Referring now to FIG. 4, another embodiment of the bearing strip and locking bar is shown for use with bearings where ease of installation is desired and with long bearings having lengths greater than four diameters wherein the locking bar 50 may be preassembled with the bearing strip 40, this assembly slipped into the housing, and the bearing strip then locked into position by longitudinal movement of the locking bar a distance less than its total length. In this embodiment, the bearing strip 40, which is shown in perspective with the base uppermost, has the sides of the longitudinally extending flat bottomed groove 41 formed with inwardly extending lugs 42 disposed longitudinally along the sides of the groove. The lugs 42 are of equal length and equal spacing with a groove 43 undercut in the sides and arranged in symmetrically matched pairs along the groove, such that each lug on one side of the groove is directly opposite a lug on the other side of the groove with the space between any two lugs on one side of the groove directly opposite a corresponding space on the opposite side of the groove. The locking bar 50 has a generally rectangular cross-section, similar to the embodiment of FIG. 2, but differs therefrom by having spaced lugs 51 extending outward from the opposite edges of the bar. In the preferred form of the invention lugs are formed on two sides of the bar; however, the invention may be practiced with lugs on only one side of the bar 50 with the opposite side of the bar being straight. The lugs 51 are of equal length and are equally spaced, however, the space between each lug 51 is slightly greater in length than the length of each of the lugs 42 on the bearing strip and has a lateral extent slightly greater than the lateral extent of the lugs 42 on the bearing strip. The length of the lugs 51 on the locking bar is slightly less than the length of the space between the lugs 42 in the groove and are also disposed in longitudinally matched pairs. The construction is such that the locking bar 50 may be assembled loosely into the groove of the bearing strip 40 by disposing the lugs and the spaces of the bar 50 in interfiitting relationship with the spaces and lugs, respectively, of the bearing strip 40. This enables the locking bar bearing strip assembly to be slipped longitudinally into the groove of the bearing housing without any interference from the locking bar. The thickness of the locking bar is preferably equal to the depth of the groove in the bearing strip such that when the locking bar is assembled into the groove, the locking bar provides radial support for the bottom of the groove 41 to prevent deflection under bearing pressure.

When the bearing strip 40 and the locking bar 51 are inserted in the bearing housing with the strip 40 disposed between ribs such as 11, the bearing strip is restrained from longitudinal movement by any convenient means. The locking bar 50 is then moved longitudinally relative to the bearing strip a distance equal to the length of the lugs 51 on the locking bar thus disposing the members in the relationship shown in FIG. 4. In order to move the locking bar to this position, it is necessary to press or drive the lugs 51 on the locking bar between the lugs 42 in the groove of the bearing strip. This movement of the bar 50 causes an interference fit, which results in spreading the sides of the groove in the bearing strip outwardly against the sides of the ribs in the housing. To facilitate this movement, the lugs 42 and 51 preferably are provided with inclined surfaces 44 and 52 as shown in FIG. 4.

Substantial force is required to move the locking bar which must be sufficiently rigid and have a compressive strength of at least that of rigid plastic to withstand the application of this locking force. In the preferred form of the invention, the locking bar is made of rigid plastic or other suitable materal such as hard rubber or glass fiber impregnated resinous material having sufficient stiffness to resist the force required to press the locking bar into locking position. The locking bar is made of material having a tensile modulus of at least $2.5 \times 10^5$ p.s.i. and in the embodiment of FIGS. 2 and 3 the bar is also preferably made of plastic having the same characteristics. Additionally, the material for the locking bar should be chosen to have a water absorptiveness no greater than a rigid plastic such as polyvinyl chloride.

The embodiment of FIG. 4 thus permits a preassembly of the bearing strip and locking bar means, slip-fitting installation of this assembly into the housing and only a short stroke movement of the locking bar to secure the bearing strip into the housing. Thus, the embodiment of FIG. 4 eliminates the need of driving the locking bar its full length into the bearing strip under an interference fit.

Figure 5:
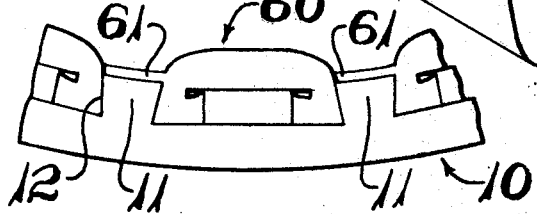
FIG. 5 is a view similar to FIG. 2 showing another embodiment of the invention.

Referring now to FIG. 5 another embodiment of the invention is shown which is similar to the embodiment of FIG. 2. The bearing insert strip 60 of elastomeric material has shape and dimension similar to the strip 20 of FIG. 2 or the strip 40 of FIG. 4 with an additional perpendicularly projecting tab 61 extending outwardly from one edge of the strip. The tab 61 extends outwardly a distance sufficient to cover the radially inner surface of the rib 11 formed by the grooves 12 in the bearing housing. The tab 61 is so formed that when the strip is inserted in a groove 12 the tab contacts and is radially deflected by the rib 11 with the tab extending in firm contact with the rib and into contact with the next adjacent strip. The tab thus exerts pressure upon the radially inner surface of the rib and being in contact with the next adjacent rib thereby provides a corrosion resistant cover for the rib 11.

Modifications and adaptations may be made by those having ordinary skill in the art and the present invention is limited only by the spirit and scope of the appended claims.

I claim:

1. A removable bearing strip for a bearing assembly comprising an elongated strip of elastomer generally rectangular in transverse section with two opposite substantially planar parallel faces one of which has a longitudinal groove formed therein with a plurality of lugs extending from at least one side of said groove in longitudinally equally spaced relationship said strip being adapted to slip-fit into a groove in the bore of a bearing housing and to have removable bar means pressed into the said groove in the strip in engagement with said lugs for securely locking said strip in said housing by deflecting the sides of said strip outwardly into clamping contact with the sides of the groove in said housing.

2. The bearing strip as defined in claim 1, wherein the said groove is substantially T-shape in transverse section.

3. A strip defined in claim 1 wherein the said strip has a longiutdinal tab projecting outwardly from one edge for covering the adjacent rib when said strip is installed in a groove in a bearing housing.

4. The strip defined in claim 1, wherein the said groove in the said planar face has a flat bottom and mutually parallel sides with each side perpendicular to said planar surface.

5. The strip defined in claim 1 wherein said groove has a plurality of said lugs extending from both sides of said groove which lugs are adapted to interengage corresponding lugs on opposite sides of a locking bar means when said means is received in said groove.

6. A bearing strip assembly comprising:
(a) an elongated strip of elastomeric material having a generally rectangular transverse section with two opposite substantially planar parallel faces one of which has a longitudinal groove formed therein; and
(b) rigid bar means having a generally rectangular cross-section with dimensions greater than the dimension of said groove, wherein said strip has a plurality of lugs extending from one side of said groove in longitudinally equally spaced relationship, said bar means has a plurality of lugs extending from one longitudinal edge thereof and said bar means is received in said groove with the lugs on said bar means interfitting the lugs in said groove in a loosely fitting manner for securing said assembly in a groove in a bearing housing by longitudinal movement of said bar means relative to said strip an amount not greater than the length of said lugs causing interengagement of said lugs.

7. The bearing strip assembly defined in claim 6, wherein said strip has a plurality of said lugs extending from both sides of said groove and said bar means has a plurality of said lugs extending from opposite longitudinal edges for interfitting the lugs in said groove.

8. The bearing strip assembly defined in claim 6, wherein said groove in said strip has a flat bottom and mutually parallel sides perpendicular to said planar surfaces.

9. The bearing strip assembly defined in claim 6 wherein said groove in said strip has undercut sides for providing a deformable lip on each side of the groove.

10. The bearing strip assembly defined in claim 6, wherein said bar means is made of synthetic plastic having a minimum tensile modulus of $2.5 \times 10^5$ p.s.i.

11. A shaft bearing comprising:
(a) a rigid housing of generally hollow cylindrical configuration having a plurality of axially extending grooves formed on the inner periphery thereof in circumferentially equally spaced arrangement;
(b) an elongated strip of elastomeric material disposed in each of said grooves with each strip having a longitudinally extending groove in its radially outer surface; and
(c) bar means of greater rigidity than said strip received in said groove in a longitudinally press fitting manner such that the sides of said strip are expanded by said bar into contact with the sides of said groove and said strip is secured in said groove to form a circumferential bearing surface of spaced strips about the inner periphery of said housing.

12. The bearing defined in claim 11, wherein said strip has a plurality of lugs extending from one side of the groove therein in longitudinally equally spaced arrangement which lugs interengage corresponding lugs extending from one side of said bar means such that said bar means is assembled into the groove in said strip in a loosely fitting manner prior to installation of said strip in said housing and said strip is subsequently secured therein by longitudinal movement of said bar means relative to said strip which movement interengages said lugs and thereby expands the sides of said strip.

13. The bearing defined in claim 11 wherein said strip has a plurality of said lugs on both sides of said strip interengaging a corresponding plurality of lugs on opposite sides of said bar means.

14. The bearing defined in claim 11, wherein said strip has undercut sides for providing a deformable lip on each side of said groove.

15. The bearing defined in claim 11 wherein said strip has a pair of opposite parallel planar surfaces one of which surfaces is adapted to contact a rotating shaft and the said groove has a flat bottom with mutually parallel sides extending perpendicularly to said planar surfaces.

16. The bearing defined in claim 11 wherein said bar means is made of synthetic plastic having a minimum tensile modulus of $2.5 \times 10^5$ p.s.i.

References Cited

UNITED STATES PATENTS

| | | | |
|---|---|---|---|
| 1,885,339 | 11/1932 | Evans | 308—238 |
| 2,256,647 | 9/1941 | Merrill | 308—238 |
| 2,310,053 | 2/1943 | Bastian | 308—238 |
| 3,407,779 | 10/1968 | Satterthwaite | 308—238 X |

FOREIGN PATENTS

| | | |
|---|---|---|
| 493,304 | 3/1930 | Germany. |

MARTIN P. SCHWADRON, Primary Examiner

L. L. JOHNSON, Assistant Examiner

U.S. Cl. X.R.

308—239